US012695786B2

(12) United States Patent
Kumar et al.

(10) Patent No.: US 12,695,786 B2
(45) Date of Patent: Jul. 28, 2026

(54) METHOD AND APPARATUS FOR DDoS ATTACK DETECTION AND MITIGATION IN IoT NETWORK SLICES OF 5G NETWORKS

(71) Applicant: Indian Institute of Technology Delhi, New Delhi (IN)

(72) Inventors: Vireshwar Kumar, New Delhi (IN); Syed Rameem Zahra, New Delhi (IN); Brejesh Lall, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 101 days.

(21) Appl. No.: 18/527,015

(22) Filed: Dec. 1, 2023

(65) Prior Publication Data

US 2024/0223600 A1    Jul. 4, 2024

(30) Foreign Application Priority Data

Dec. 31, 2022    (IN) .............................. 202211077531

(51) Int. Cl.
H04L 9/40          (2022.01)
G16Y 30/10         (2020.01)
(52) U.S. Cl.
CPC .......... H04L 63/1458 (2013.01); G16Y 30/10 (2020.01); H04L 63/1491 (2013.01)
(58) Field of Classification Search
CPC ............. H04L 63/1491; H04L 63/1458; H04L 63/1425; G16Y 30/10
See application file for complete search history.

(56) References Cited

U.S. PATENT DOCUMENTS 11,323,884 B2     5/2022   Lifshitz et al.
2022/0167171 A1*  5/2022   Iapalucci ............ H04L 43/0888
                  (Continued)

FOREIGN PATENT DOCUMENTS

CN     111771394 A    10/2020
CN     107231384 B    11/2020
FR       3111505 A1   12/2021

OTHER PUBLICATIONS

Wikipedia article for "Honeypot (computing)" Article revision dated Nov. 9, 2022 (7 pages) https://en.wikipedia.org/w/index.php?title=Honeypot_(computing)&oldid=1120964384 (Year: 2022).*

*Primary Examiner* — Amir Mehrmanesh
*Assistant Examiner* — Thomas A Gyorfi
(74) *Attorney, Agent, or Firm* — Knobbe, Martens, Olson & Bear LLP

(57) ABSTRACT

An apparatus and lightweight method detects and prevents DDoS attacks in a 5G-IoT slice in real-time without putting the stress of security on the constrained IoT devices. The apparatus includes eight IoT devices, a gNB, and 5G core network. The core network includes of AMF, SMF, UPF, PCF, UDR, and Network Data Analytics Function (NWDAF). 5 IoT devices connected to an IoT slice via a gNB RAN and core network are loaded with DDoS code. The gNB gives the RAN part of the slice to the IoT devices while as core network functions provide the core network part of the slice. A real-time and lightweight method consisting of Intrusion Detection System (IDS) and honeypots is designed for DDoS attack detection in 5G IoT/mMTC slices. The system identifies the attack efficiently and is able to mitigate it with less computation and storage costs.

4 Claims, 13 Drawing Sheets

(56)          References Cited

U.S. PATENT DOCUMENTS

| | | | |
|---|---|---|---|
| 2022/0247779 A1* | 8/2022 | Rajput | H04L 63/20 |
| 2022/0272541 A1* | 8/2022 | Rajput | H04W 64/00 |
| 2022/0330027 A1* | 10/2022 | Djukic | H04L 47/2475 |
| 2023/0269589 A1* | 8/2023 | Baskaran | H04W 12/037 |
| | | | 726/6 |
| 2023/0291677 A1* | 9/2023 | Trakinat | G06Q 20/383 |
| 2024/0015183 A1* | 1/2024 | Bahirat | H04L 63/1491 |

* cited by examiner

20 —

30 —

30 —

| Reference Point | Description |
| --- | --- |
| N1 | Between UE and AMF to Exchange NAS (Non-Access Stratum) Messages |
| N2 | Between 5G-RAN and AMF Based on Next Generation Application Part |
| N3 | Between 5G-RAN and UPF Based on GTPv1-U (GPRS Tunnelling Protocol User Plane) |
| N4 | Between SMF and UPF to Manage Data Sessions at the User Plane. N4 is Based on PFCP (Packet Forwarding Control Protocol) |
| N6 | Reference Point Between UPF and Packet Data Networks. It can, e.g. Transport IP and Ethernet Packets |
| N7 | Reference Point Between SMF and PCF |
| N9 | Between Two UPF to Transmit user Plane Data. It is Based on GTPv1-U |
| N11 | Reference Point Between AMF and SMF |
| N23 | Reference Point Between SMF and PCF |

FIG. 12

METHOD AND APPARATUS FOR DDoS ATTACK DETECTION AND MITIGATION IN IoT NETWORK SLICES OF 5G NETWORKS

CROSS-REFERENCE TO RELATED APPLICATION(S)

This application claims priority to and the benefit of Indian Patent Application No. 202211077531 filed on Dec. 31, 2022 in the Indian Patent Office, the contents of which in its entirety are herein incorporated by reference. Any and all applications for which a foreign or domestic priority claim is identified in the Application Data Sheet as filed with the present application are hereby incorporated by reference under 37 CFR 1.57.

BACKGROUND

Technical Field

The present disclosure relates to the computer science. More particularly, the present disclosure relates to the 5G Networks, Security and Privacy, Distributed Denial of Service (DDoS) and Internet of Things (IOT).

Description of the Related Technology

New mobile communication networks are released around every ten years, delivering higher speeds and greater capabilities. While the first cellphones were given by 1G, enhanced coverage and texting features were brought by 2G. 3G combined voices with data and 4G/4G Long-Term Evolution (LTE) networks increased the data speeds. From 2G to 4G, the Radio Access Network's (RAN) spectral efficiency has improved 30 times [1]. The 5G wireless technology marks a total overhaul of telecommunication networks by providing faster data rates (very fast download speeds), ultra-low latency (near real-time interaction), and improved network capacity (allowing for simultaneous connectivity of more devices).

SUMMARY

One aspect is a real-time image apparatus and a method for detecting and preventing DDoS attack attempts in IoT slices in the 5G environment with significantly lesser computational complexity and storage requirements.

Another aspect is a method which detects and mitigates DDoS attacks in IoT slices of 5G networks with better efficiency, lesser computation and storage complexities.

In one embodiment of the present disclosure, the proposed lightweight method detects and prevents DDoS attacks in a 5G-IoT slice in real-time without putting the stress of security on the constrained IoT devices. The proposed apparatus includes eight IoT devices, a gNodeB (gNB), and 5G core network. The core network includes Access Mobility Function (AMF), Session Management Function (SMF), User Plane Function (UPF), Policy Control Function (PCF), Unified Data Repository (UDR), and Network Data Analytics Function (NWDAF). 5 IoT devices connected to an IoT slice via a gNB RAN and Core network are loaded with DDoS code. A gNB gives the RAN part of the slice to the IoT devices while as core network functions provide the core network part of the slice. A real-time and lightweight method including Intrusion Detection System (IDS) and honeypots is designed for DDoS attack detection in 5G IoT/mMTC slices. The proposed system identifies the attack efficiently and is able to mitigate it with less computation and storage costs.

BRIEF DESCRIPTION OF THE DRAWINGS

The drawings described herein are for illustrative purpose only of selected embodiments and not all possible implementations and are not intended to limit the scope of the present disclosure. The disclosure itself, however, both as to organization and method of operation, may best be understood by reference to the detailed description which follows taken in conjunction with accompanying drawings.

FIG. 12 presents the embodiment of reference point description of all the present User Plane security enforcement.

DETAILED DESCRIPTION

Figure 1:
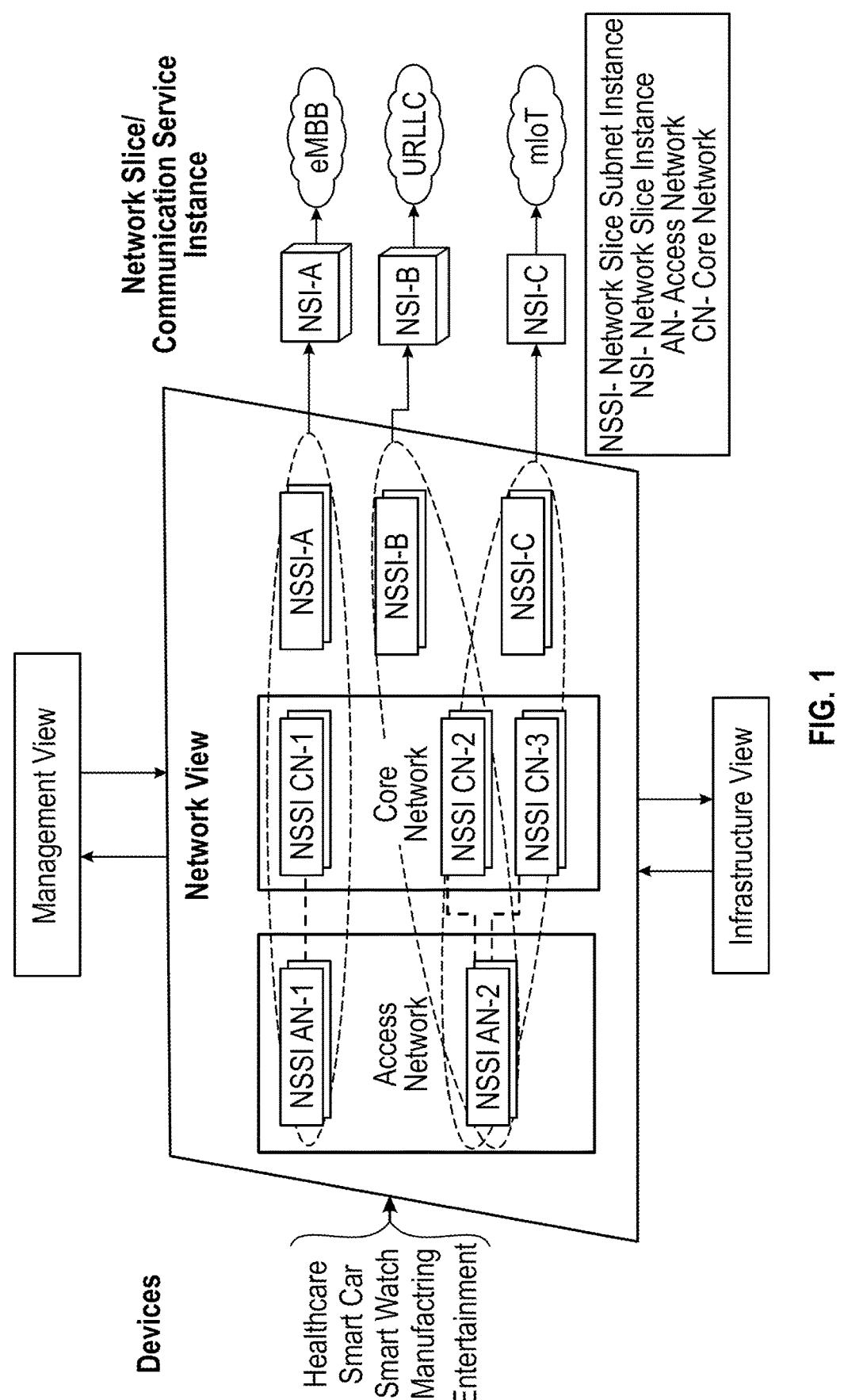
FIG. 1 illustrates the 5G service-based architecture and Network slicing interdependence view implemented in the present disclosure.

The essence of 5G is to cater to a multitude of different verticals, offering customized services according to the specifications and types of devices in those verticals. This necessitates that the network takes distinct shapes depending on the service being provided. Traditional network architectures cannot match the 5G specification because the variety of services is vast and their speed balancing is challenging. In a typical network environment, regardless of whether the core network (CN) or RAN, there are dedicated devices that lend specific services. Any slight changes might easily result in a general service stoppage, inefficiency, and massive hardware costs. As a result, Next Generation Mobile Network (NGMN) coined a new network paradigm called Network Slicing. Because 5G communication necessitates extensive network access, the idea of network slicing was proposed to dissect the underlying physical network into numerous virtual networks, each of which can dynamically cater to distinct services. As a result, each service no longer needs to be mapped to dedicated network resources, which significantly lowers the hardware costs.

However, to realize this service-oriented vision of network slicing, the mobile network architecture must fundamentally be rethought to transform it into a more pliable and programmable material. This can be done by using technologies such as Software Defined Networking (SDN) and Network Functions Virtualization (NFV).

Moreover, with IoT devices/mMTC slice introduction being the essence of 5G, it is imperative to look at 5G security from the perspective of Network Slicing paradigm. It is an established fact that most of the IoT devices have "walled off" architectures and is inherently constrained and therefore insecure where they can't even run minimal anti-virus software or other security patches, turning them into sitting ducks for sophisticated cyber attackers. Recent assaults such as Mirai, Wicked, Hajime, Katana, and Amnesia: 33 attest to the veracity of this assertion. Research on the modus operandi of ring-camera hackers showed that the attackers did not even hack the cameras but simply logged-in by purchasing the credentials from the dark-web. With this, we can only fathom what a skilled cyber-attacker could accomplish to an unprotected "billion-device-large" 5G-IoT network. As such, when huge number of IoT devices in the mMTC slice are requesting for services, it is possible that a large number of them are compromised and turned into bots. These devices are allowed to be a part of 8 network slices simultaneously indicating the establishment of 8 PDU sessions [2]. IoT devices, like Internet connected vending machines or Internet connected cameras, etc. will always want to connect to specific domains/slices. For example, a cola vending machine may routinely connect with "xyzcola.com". As such, there is no reason for a cola machine to access another domain/slice.

That is if a cola vending machine asks for a switch to a slice servicing an organizations administration, anomalies could be detected. By being intrinsically insecure, sophisticated attackers could easily turn a massive number of these IoT devices into bots and make them access different slices. Since it is allowed as per the standards, no doubt is created when a device asks for access in a network slice. The only limitation is that a device can simultaneously be a part of 8 different network slices. With huge number of compromised devices, and each roaming in 8 different slices, the compromised devices have the ability to create havoc.

Similarly, IoT devices tend to have stable and predictable network behavior and traffic. Each vending machine, for example, sends 5 kilobytes of data every hour and once a day at 2 AM, it sends an extra 10 kilobytes of data. This is because it has to perform the same function and send the same information every time. As such, this information could be used to help the present disclosure to detect irregularities. For example, if a cola vending machine is sending 100 kilobytes of data every minute, it means that this vending machine is compromised.

With IoT devices, falsely triggering re-registration is not a big deal. Also, when the device wants to connect to another slice, it is first re-authenticated with the core. Therefore, a DDoS attack that triggers massive re-registration and re-authentication requests can just seem like a benign scenario where devices are just trying to register and authenticate with the network. It is also implied that when a botnet of compromised IoT devices are launching malicious registration and authentication requests, it is very difficult for the network to identify malicious registration requests from benign ones. Therefore, if the attacker can perform 100 registrations per second (with just 4 compromised devices), the core network would take a few minutes to register a benign UE, harshly affecting the service and the function of UE.

Moreover, the current patented work and the Third Generation Partnership Project (3GPP) specifications have the following drawbacks that can lead to various security vulnerabilities in IoT/mMTC slices of 5G, including the dreaded DDoS attacks.

US patent '11,323,884 B2' gives a detection, mitigation, and isolation method for signaling storms in 5G. It groups IoT devices into groups and defines a normal baseline behavior for each of these groups, terming it Regular Baseline Cellular Communication Behavior (RBCCB). The proposed method, however, neglects the fundamental characteristic of IoT devices, i.e., dynamism.

Defining a static behavior for a group of IoT devices is against their basic nature and working. While IoT devices act as sources and destinations of data, they also act as the forwarding nodes of the data. As such, defining something like "a particular IoT device will send this much data after every three hours" is rigid. The grouping of IoT devices is equally challenging given the range of heterogenous protocols, authentication, and access control mechanisms, RAN technologies, interface ranges, firmware employed, different storage capacities, etc. The work of has grouped devices based on K-means algorithm. K-means algorithm can only be used when the devices are at a particular distance from each other. Hence, the devices will not be grouped on the basis of their characters but their distance from the centroid. That is, it is applicable only when similar types of IoT devices are used to launch the attack.

The document 'CN 107231384 B' [30] discloses a DDoS attack detection and mitigation method in 5G network slices using the SDN based architecture. The proposed method, however, doesn't particularly deal with the unique IoT devices and IoT network slices even though the chances of DDoS attacks are maximum in these slices. Most dreadful DDoS attacks of recent times, like Dyn attack, Mirai botnet, etc. were launched using peculiar characteristics of IoT devices.

Another document 'CN 111771394A' [31] provides a method for grouping Ues and Protocol Data Unit (PDU) sessions on the basis of context. While grouping manages resources, it will create huge security vulnerabilities as the presence of just one malicious node in a group can lead to ambiguities in resource allocation. It can also lead to DDoS attacks in the slices because a group of devices can collude together, imply a similar context, and ask for more resources when actually they are not required. It is, therefore, important to take the security aspect of devices into account.

Another document 'FR3111505A1' [32] reveals a mechanism for monitoring one slice of a network using the confidence index assigned to the slice. The method works on analyzing the confidence level assigned to the slice depending on the behavior of just one element in that slice. The work totally ignores the possibility of the collusion attack where a group of malicious nodes can work together to bring down or enhance the reputation/confidence of a particular entity. As such, if a group of attackers with common intention select a node and bring its confidence level more than a threshold, the method proposed here will fail. The drawbacks of the Third Generation Partnership Project (3GPP) specifications include:

Every Time User Equipment (UE) Asks for a Slice, it is Reauthenticated with the Core:

As per the Third Generation Partnership Project (3GPP) communication standards, two mechanisms are used for bootstrapping, viz. Primary authentication that defines mandatory steps to be followed by the device for getting connected to the Serving Network/SN (5G core) and Secondary authentication that relates to domains of security that are outside the SN. The Third Generation Partnership Project (3GPP) gives the provision for the device to be a part of 8 different slices at the same time [2]. However, the Third Generation Partnership Project (3GPP) does not explicitly specify the authentication mechanism to be followed when a device wants to access another slice. The obvious method is to get re-authenticated from the 5G core. This provision may be acceptable in eMBB or uRLLC slices where the number of devices is limited but when it comes to the mMTC/IOT slice, the situation becomes more complex.

A huge number of IoT devices can take part in a slice (a single user may own multiple IoT devices) and each device could be using a different Low-Power Wide-Area Network (LPWAN) technology each having its own unique characteristics and operating modes. As such, unifying and homogenizing authentication mechanisms are specified for IoT. The Third Generation Partnership Project (3GPP) however, gives two general and mandatory mechanisms for primary authentication, i.e., 5G Authentication and Key Agreement (5G-AKA) and Extensible Authentication Protocol (EAP-AKA). These protocols are based on the unique identities of subscribers and symmetric cryptographic algorithms. That is, the main problem in current 5G cellular networks, as well as in the Third Generation Partnership Project (3GPP) specifications on 5G is that the AAC (Authentication and Access Control) of IoT devices is done in the same manner as the AAC of eMBB user equipment (UE).

The present disclosure comprises of the device layer, where the present disclosure only considered the IoT devices, and where every device is assigned a slice of RAN network and a slice of CORE network before it reaches to the intended IoT service, and featuring real time, lightweight, and heterogeneity supporting Intrusion Detection System (IDS) for identifying the compromised IoT devices launching the DDoS attack exploiting re-registration and re-authentication factors. The system of the present disclosure detects, predicts, and prevents these DDoS attacks. It profiles the devices according to their capabilities and monitors various parameters which change when unnecessary slice switches are requested. It identifies the compromised devices with the help of honeypots and Intrusion Detection System (IDS) placed at different locations of the network and stops them from moving into critical slices. Many researchers have tried to solve the security issues of 5G networks and devices over the past few years. Here, the present disclosure take a critical look at some of these security postures [3-10] to show what they have brought to the table and how they moved the state-of-art forward. The present disclosure chalked out their major achievements and claims. The critical analysis and difference from the work of the present disclosure is also done. From a 5G-IoT network slicing point of view, the present disclosure also point out their biggest flaws.

To sum up, the existing technologies have many limitations. Hence, there is a limitation that arises to the establishment of an apparatus and method for a system for real-time DDoS attack detection and mitigation in an IoT network slices of 5G. The proposed product and process is easy to implement, cheaper and more importantly.

Numerous specific details are set forth in the following description in order to provide a thorough understanding of the disclosure. However, the disclosure may be practiced according to the claims without some or all of these specific details. For the purpose of clarity, technical material that is known in the technical fields related to the disclosure has not been described in detail so that the disclosure is not unnecessarily obscured.

As used herein, the singular forms "a", "an" and "the" designate both the singular and the plural, unless expressly stated to designate the singular only.

The plurality of IoT devices are compromised to launch a DDoS attack on the end-end IoT network slice and consequently the high security demanding slices sharing components with the end-end IoT network slice of the disclosure.

The present disclosure takes into account the inherent vulnerabilities of IoT devices. Most of the research work is currently focused on how 5G-IoT use cases can bring ease and comfort into the lives of masses. However, the existing technologies do not acknowledge the impact of the IoT and Network slicing security issues on the growth and development of 5G. The present disclosure brings these security issues to the front burner and tries to address them.

The present disclosure identified the possibility of DDoS attack on core network components through re-authentication specification in 5G-IoT network slicing. The suggested IoT device specific security policies to isolate the misbehaving IoT devices in real-time.

The present disclosure has given specific security policies to be implemented on two significant core network functions that are directly linked to the User Equipment/UE, i.e., Access Mobility Function (AMF) and Session Management Function (SMF) to stop the infection/malware from spreading into high security slices. Once identified, one such AMF policy will bar the misbehaving UE's from moving into high security zones/slices.

The present disclosure uses honeypots loaded with Deep Neural Network algorithms for real-time detection of DDoS attacks. The weakest entry points in the IoT network are identified and turned into honeypots. These honeypots are deployed to ruse the attackers into attacking them. These points are constantly monitored for new threats and analyzed to build threat intelligence to proactively mitigate production systems from similar attack surfaces. The security is handled by the honeypots. As such, the present disclosure takes away the load of ensuring security away from the constrained IoT devices. It eliminates the memory and processing overhead of IoT devices since they don't have to run security algorithms themselves.

For DDoS attacks in 5G-IoT Network slice setting, no dataset is available currently. The present disclosure is creating the data set by generating the attack traffic and suggests creating of security profile for every service request in 5G just like QoS profile. By having the security profile, it can be made sure at the inception of a session that the security specifications of a device are complaint with.

Besides Honeypots, the present disclosure also uses the recently incorporated entity (3GPP Release 16) called for identifying misbehaving IoT devices. The present disclosure analyzes Network Data Analytics Function (NWDAF) for load and performance metrics. The present disclosure takes into account the dynamism of Network slicing and IoT devices in its policies. As devices can shift to different operators/domains, the present disclosure allows the transfer of security policies (implemented on AMF and SMF) to PCF and include them in the dynamic PCC rules for user plane security, as well as extending them to other domains like, N3, N6, and N9. By having this provision, the entire security profile is copied into the domain into which device moves.

The lightweight and generic system provides fast detection rate, occupies less memory and has less computational complexity.

An apparatus of the present disclosure having IoT devices and a base station are compliant with the specifications specified in the Third Generation Partnership Project (3GPP) specifications 38.101 and 38.104 respectively. The plurality of IoT devices in the present disclosure is 8 in number.

In another embedment of the present disclosure, a method of preparation for a real-time and a lightweight system for DDoS attack detection and mitigation in IoT network slices of 5G comprises of:

implementing 5G Service-Based Architecture (5G-SBA) architecture;
    identifying weakest points in the IoT slice through continuous monitoring;
    turning the weakest points into a honeypots;
    applying deep neural network algorithms to detect DDoS in the real-time on the honeypots, and security policy enforcement through an AMF, a SMF and a PCF.

The honeypots can be installed on the device layer or on the communication links between IoT devices and the gNB. The honeypots are deployed to ruses the attackers. The honeypots are constantly monitored for new threats and analyzed to build specified threat intelligence to proactively mitigate production systems from similar attack surfaces.

Reference is made to FIG. 1, which is an illustrative diagram of the Third Generation Partnership Project (3GPP) standardized 5G architecture and the Third Generation Partnership Project (3GPP) view of 5G network slicing [36]. It indicates that after reading the communication service instances of a user equipment (UE), a Network slice Instance (NSI) is selected. After that a Network Slice Subnet Instance (NSSI) is chosen. Here, the NSSI gets a dedicated core slice and a dedicated RAN or access network slice; however, NSSI B and NSSI C share the RAN network components. Similarly, there is a provision for the sharing of core components as well.

The most important feature of 5G is the support to different verticals while maintaining isolation. The vision of shared network slicing creates a doubt in that possibility. Moreover, network slicing is dynamic. Slice allotment in 5G occurs in a very dynamic manner, where the user equipment first displays various communication services instances and the network orchestrator and management functions select a domain in which the device should enter. This dynamism creates an environment of confusion, uncertainty and doubt (CUD) as in the first instance it is unknown how the user equipment (UE) will behave, what all the slices will the user equipment (UE) ask for? How much CPU will it consume? How much bandwidth, how much storage? There are no definite answers to these questions.

Additionally, one device can be a part of 8 different network slices simultaneously [2]. This provision has been kept in view of the situation that a user may need to do different tasks in different slices at one time.

However, this arrangement will allow malicious user equipment (UE) to infect 8 slices simultaneously. It also paves the way for the dreaded Distributed Denial of Service attack. Multiple malicious devices can ask for admission into 8 different slices, and subsequently will lead to the overwhelming of various core network functions.

Figure 2:
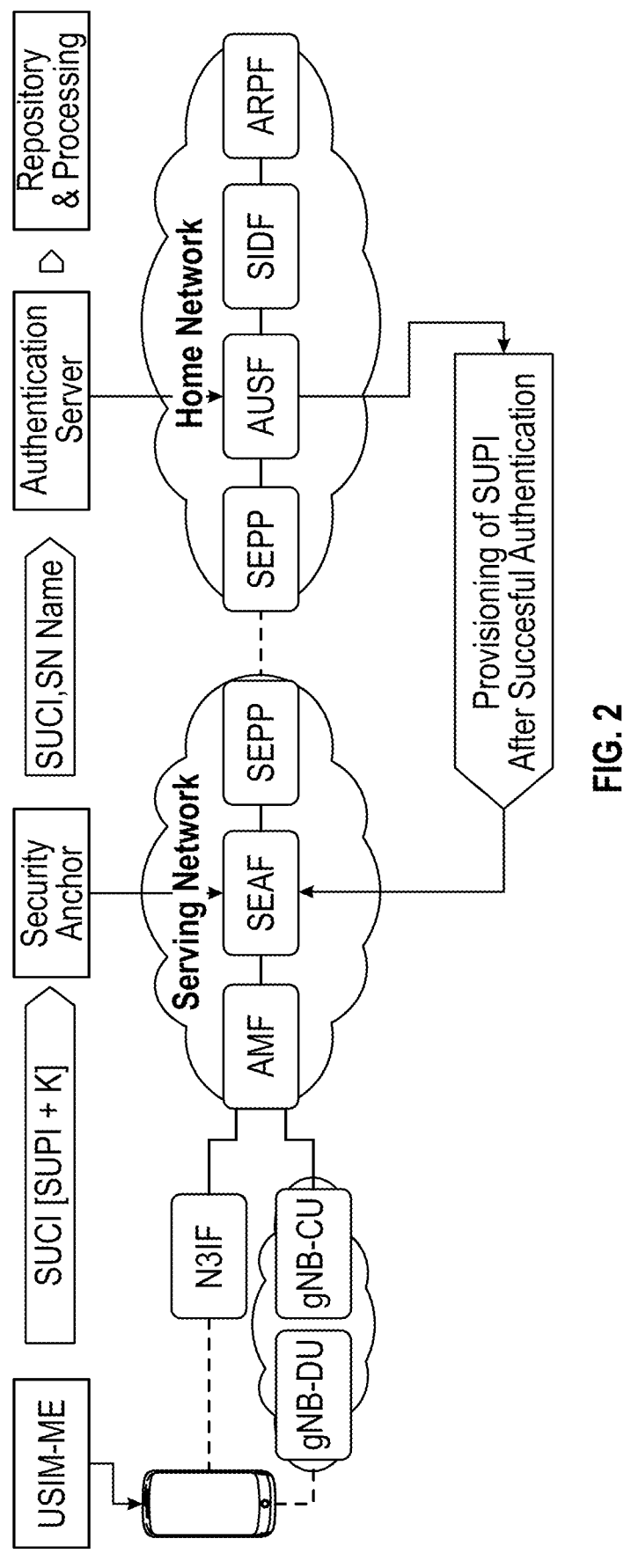
FIG. 2 illustrates the working of primary authentication in 5G.

Reference is made to FIG. 2, which is an illustrative description of the manner in which authentication of devices and slice selection happens in 5G. It shows the mechanism of 5G primary authentication using concealed SUCI (5G-AKA). The figure clearly shows that it is mandatory for a device to have SUPI In the Third Generation Partnership Project (3GPP) specification [34], the user equipment (UE) specifications mentions that user equipment (UE) must support ciphering but it has a provision of not using it. For IoT devices running the complex 5GAKA or EAP-AKA even once is resource intensive. It is a must to use ciphering. As such, the specifications of user equipment (UE) are ambiguous and contradicting. When these devices have to run complex authentication procedures every time they need to move to another slice, it will be extremely heavy for the devices and they will be left with no resources to do other intended and important tasks. As such, if an attacker wishes to launch DDoS attack on the device side in 5G mMTC slice, it can very easily do that by making the device ask for services from other slices. The device will have to run the authentication mechanism multiple times which will completely drain it.

In the same manner, the DDoS attack can be launched on the Core network slice. As the architecture is service based and there is a provision for shared network slice, many functions from the core (particularly AMF) are shared among multiple slices. An attacker from an IoT slice can corrupt multiple IoT devices and make them use resource heavy common procedures from the shared functions. Authentication also involves collaboration from multiple core network functions like AMF, SEAF, AUSY, ARPF, NSSF, NEF etc. When multiples IoT devices (each having the freedom to be in 8 slices at one time) will ask for re-authentication from the core, it will burden the functions unnecessarily creating congestion.

Figures 3, 4:
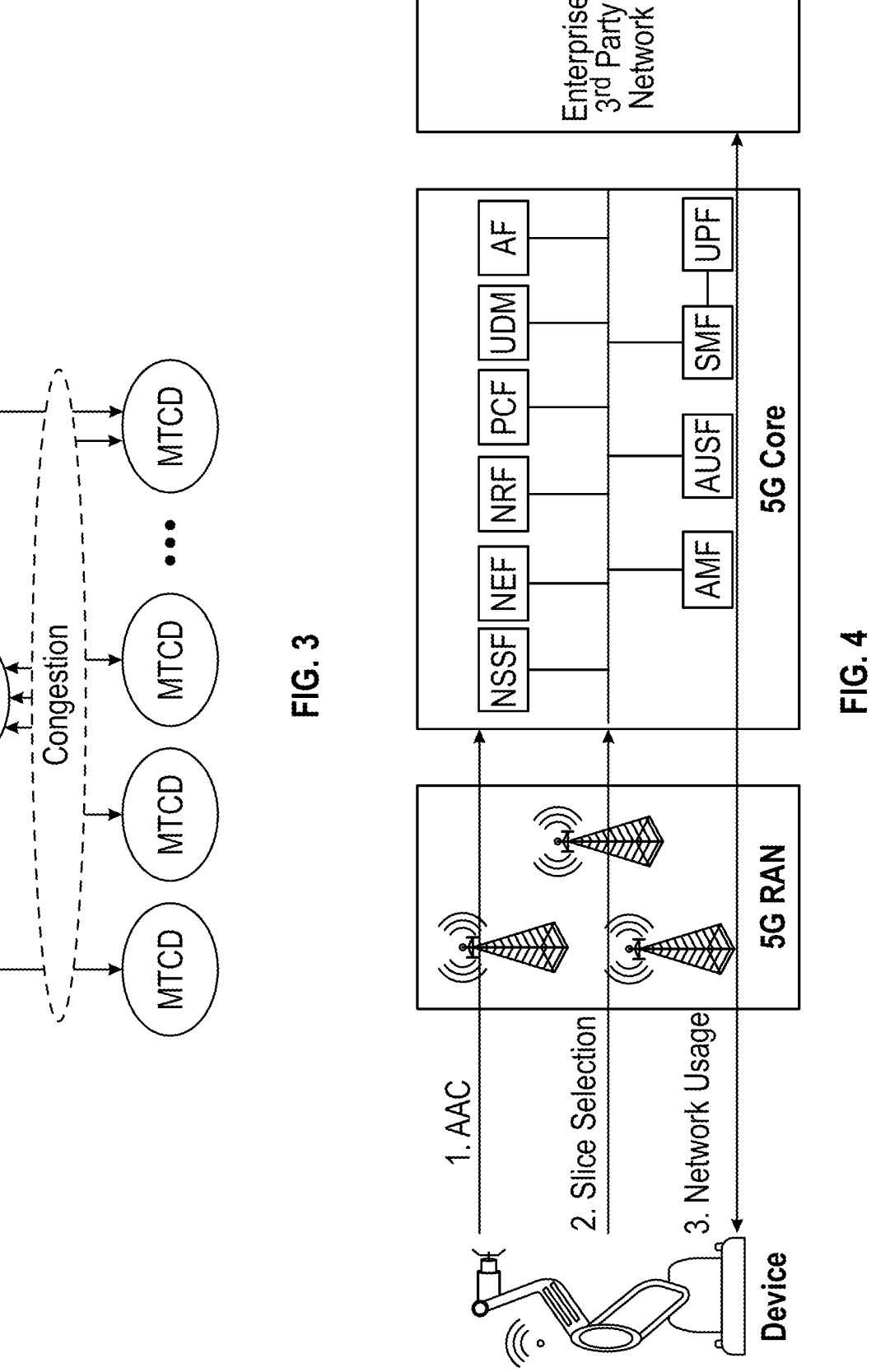
FIG. 3 illustrates the effect of DDoS attack on 5G core.
FIG. 4 shows the steps followed in authentication and slice selection procedures in 5G.

Reference is made to FIG. 3, which is an illustration of the congestion happening because of the burden caused on the network through repeated re-authentication and re-registrations. As such, the genuine devices will not get authenticated quickly—an example of DDoS on 5G core.

Also, reference is made to FIG. 4, which is an illustrative representation of the steps followed in authentication and slice selection procedures in 5G.

Step 1: authentication and access control is established with the core.
    Step 2: depending on the outcome of step 1, slice is selected for the device.
    Step 3: usage of the slice occurs.

The AAC procedure for devices given in the Third Generation Partnership Project (3GPP) release 16 illuminates the paths for massive privacy issues. In FIG. 4, a third party's network has obtained a dedicated slice from the operator. One of the reasons for this can be that the enterprise wants to keep the identities of its devices and users anonymous but as per the procedure specified in FIG. 4, the devices (even when they belong to the party owning the slice) have to separately authenticate with the core, thereby revealing the confidential credentials to the network operator.

Figures 5, 6A:
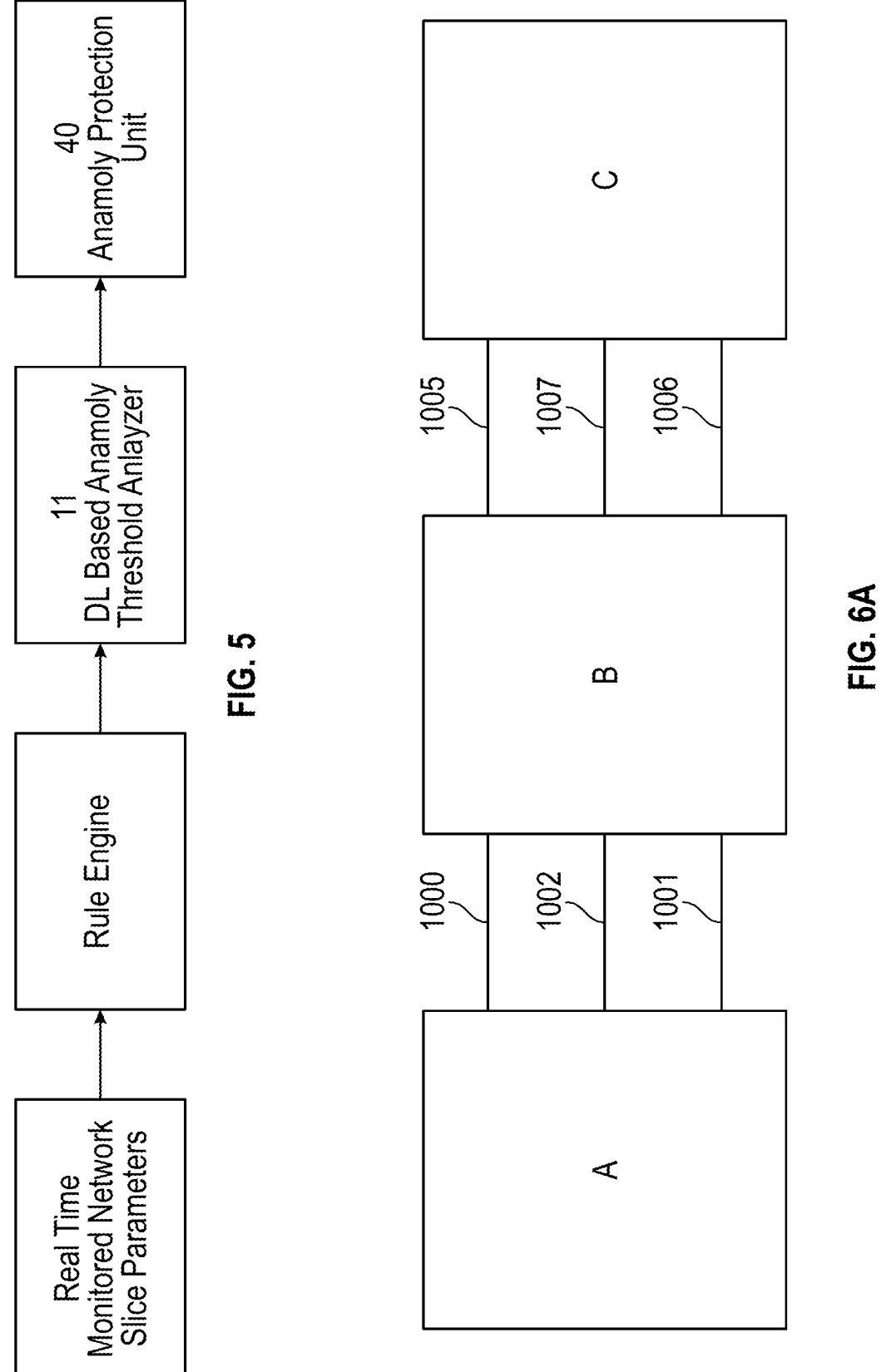
FIG. 5 illustrates a schematic block-diagram of the proposed Intrusion Detection System (IDS).
FIGS. 6A-6D are schematic illustrations of the system that defines the entire working and placement of the proposed Intrusion Detection System (IDS) and its various sub-components.
Figure 6B:
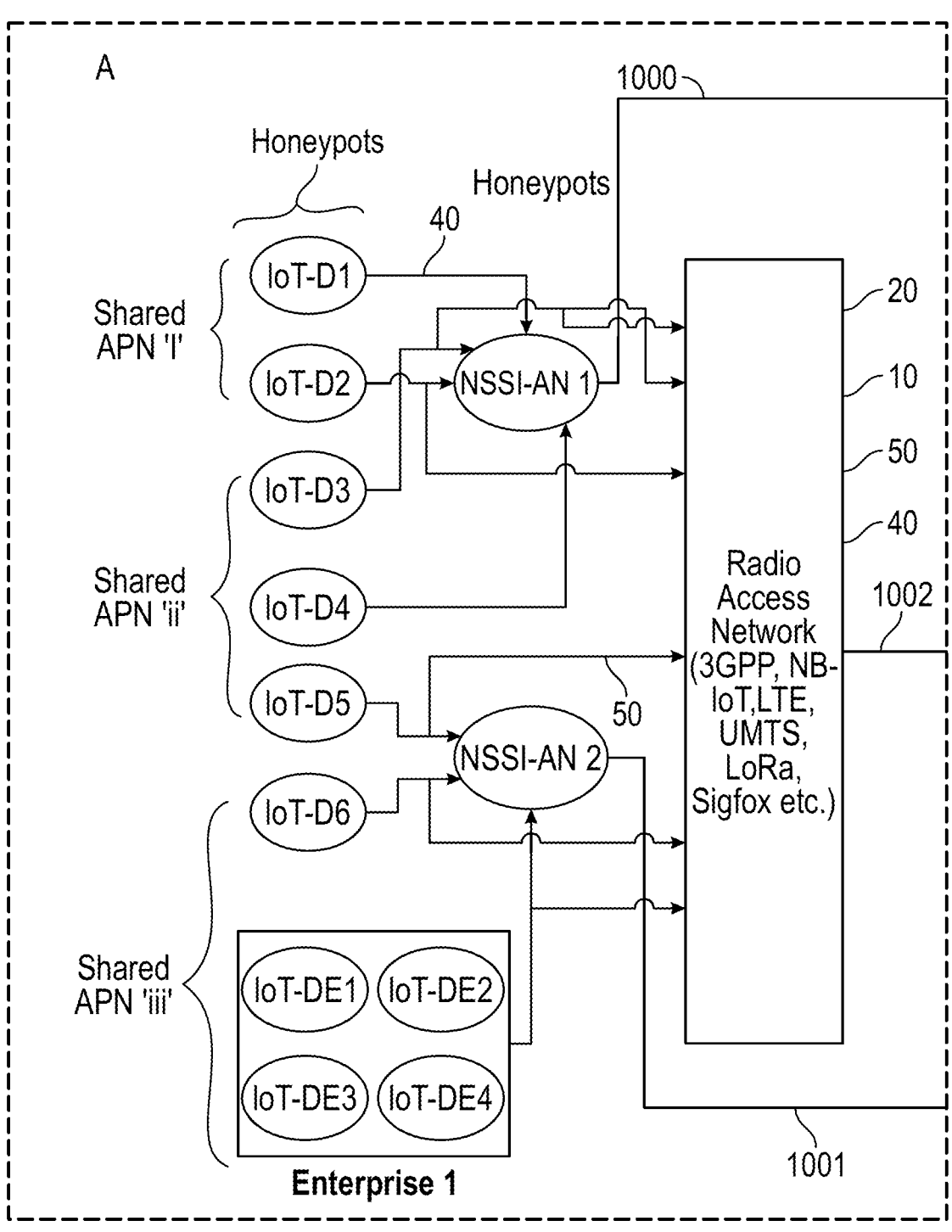
Figure 6C:
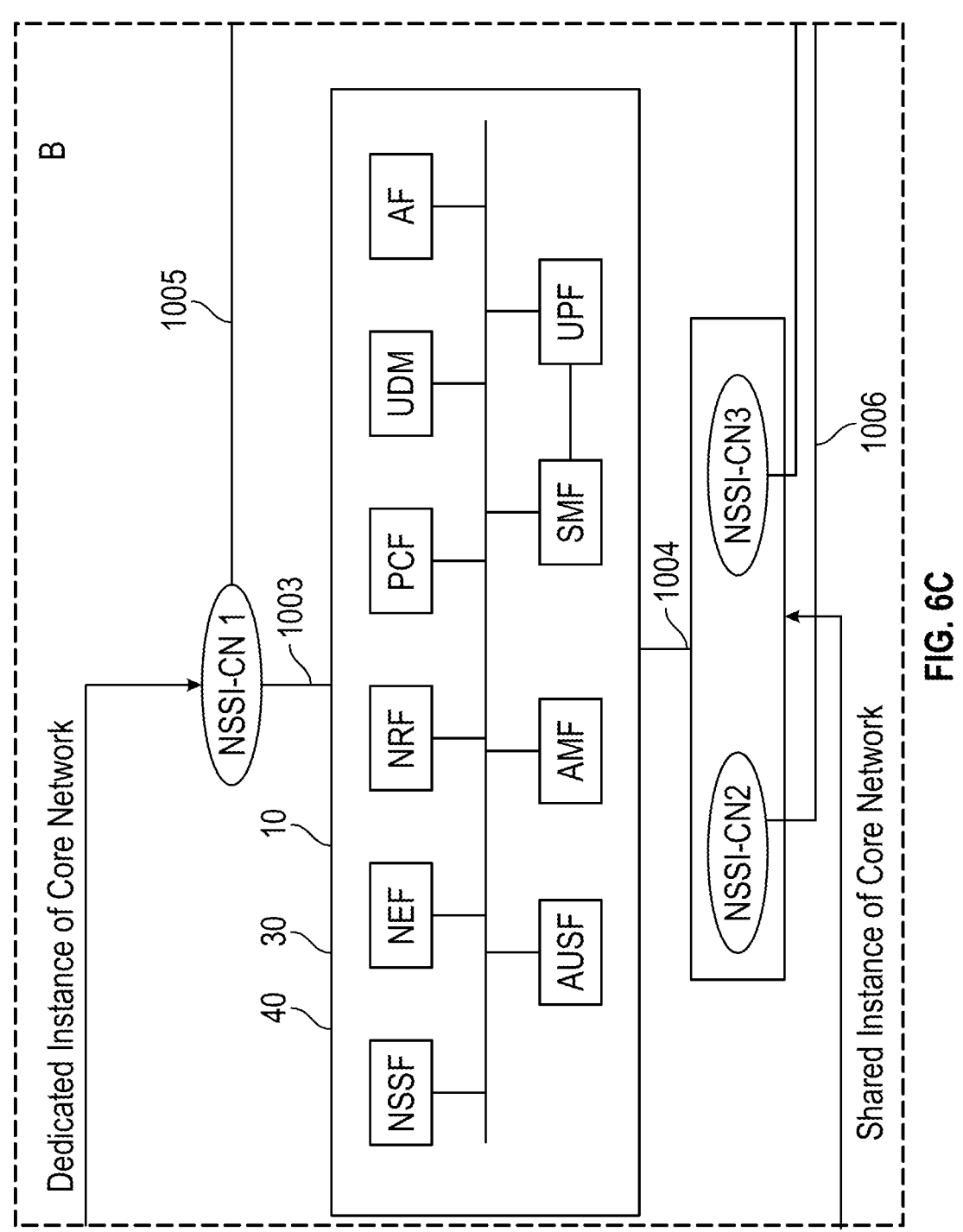
Figure 6D:
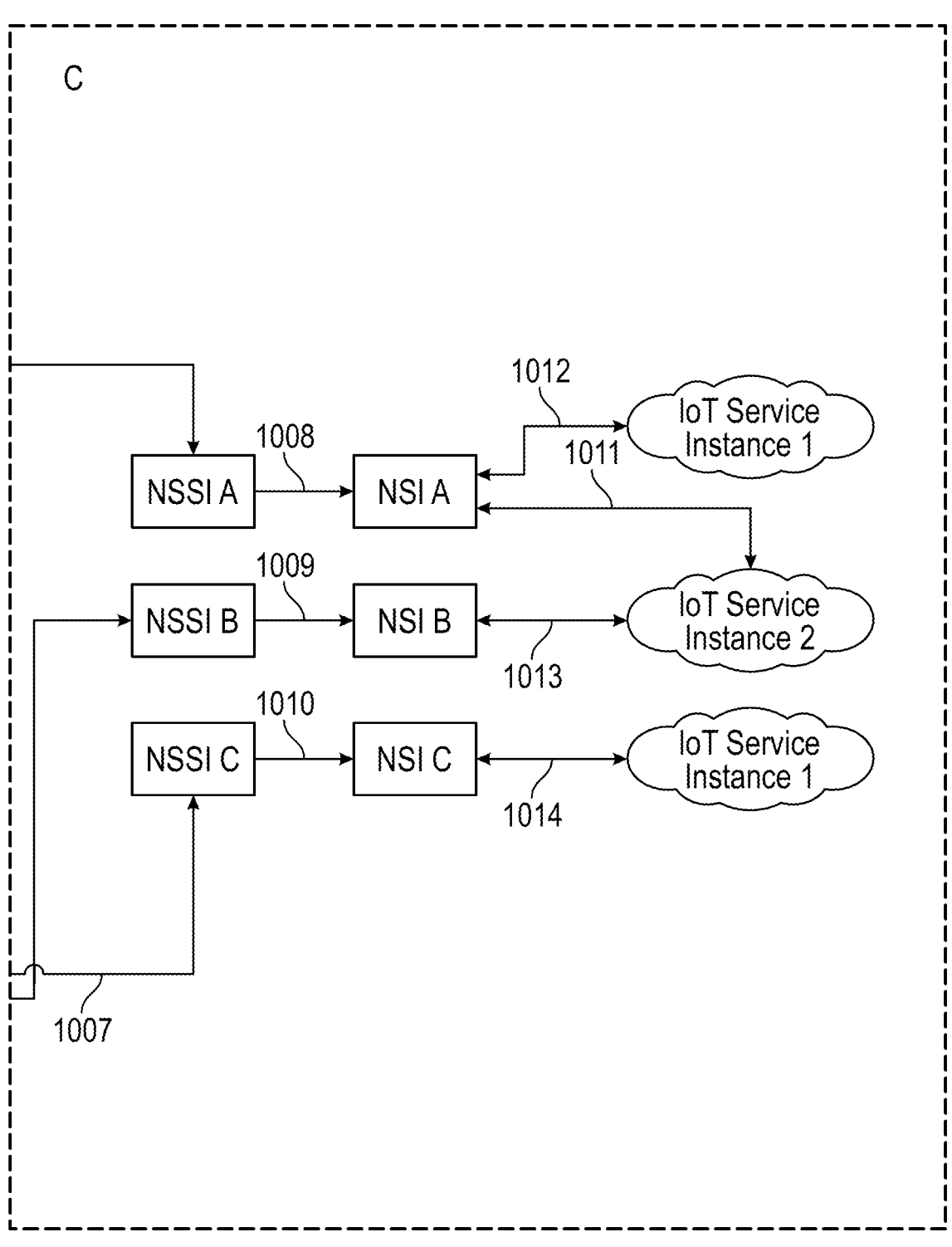

The design of the security posture for detecting, predicting and preventing DDoS attacks in 5G IoT network slices includes the following steps:

Intrusion Detection System Placement:

Pertaining to some demonstrative implementations of the present disclosure, reference is made to FIG. 5 which is a schematic depiction of security system proposed for providing a generic and real time detection and mitigation against DDoS attacks in 5G network slicing environments. The overall system monitors the network slicing parameters in real time, applies the rules on the monitored values, analyzes the values for anomalies using deep learning-based threshold analyzer and finally alarms the protection unit if need arises.

Reference is made to FIGS. 6A-6D, which are schematic illustrations of the system that defines the entire working and placement of the proposed Intrusion Detection System (IDS) and its various sub-components.

For demonstrative purposes, the present disclosure show 6 different IoT devices and an "enterprise-1". The set of IoT devices, D1-D2 utilize a shared Access point name (APN-i). Similarly, the set D3-D5 share the APN-ii while as the IoT-D6 and Enterprise-1 share the APN-iii. The Network Slicing Subnet Instance of the access network 'NSSI-AN 1 and 2' respectively attach devices IoT-D1-D4 and IoT-D5-D6, Enterprise 1 to the Radio Access Network. The system may make use of a suitable RAN 104, such as the Third Generation Partnership Project (3GPP), Narrow-Band IoT (NB-IOT), 4G/Long Term Evolution (LTE), Universal Mobile Telecommunications System (UMTS), or any other RAN type; for instance, IoT-specific RAN types such as LoRa, Sigfox, or the like may also be utilized. Systems 10 (Alarm Generation Unit), 20 (parameters monitored at gNB), 40 (protection unit) and 50 (device identifier unit) can also be deployed on the gNB (RAN).

Honeypots can be installed on the device layer or on the communication links between devices and gNB. The weakest entry points in the IoT network are identified and turned into honeypots. These honeypots are deployed to ruse the attackers into attacking them. These points are constantly monitored for new threats and analyzed to build threat intelligence to proactively mitigate production systems from similar attack surfaces.

Figure 7:
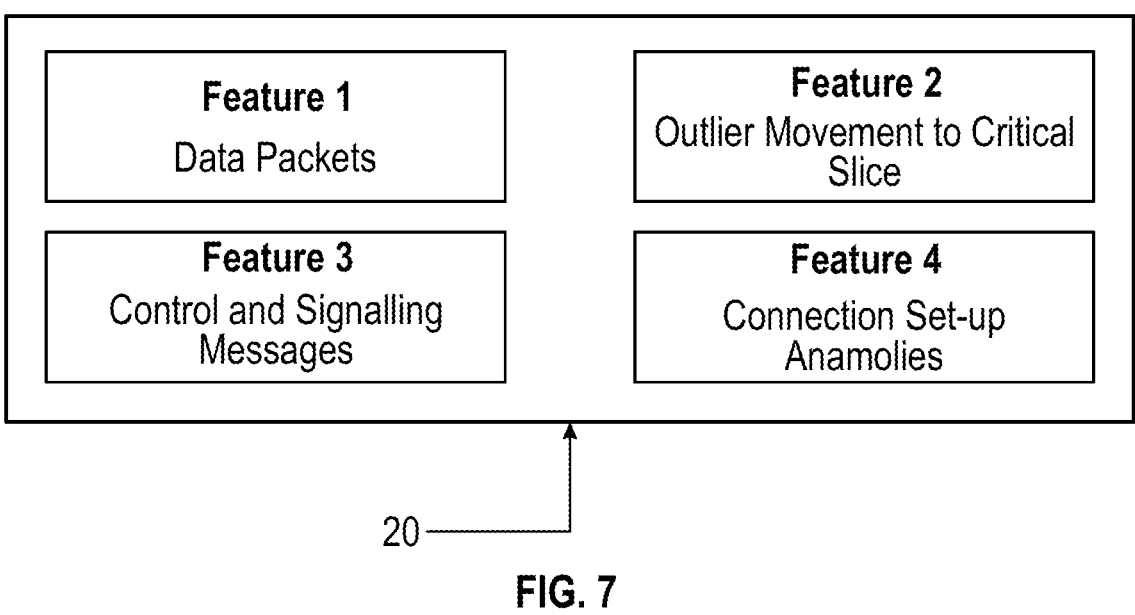
FIG. 7 lists the parameters that are monitored in real-time at gNB.
Figure 8:
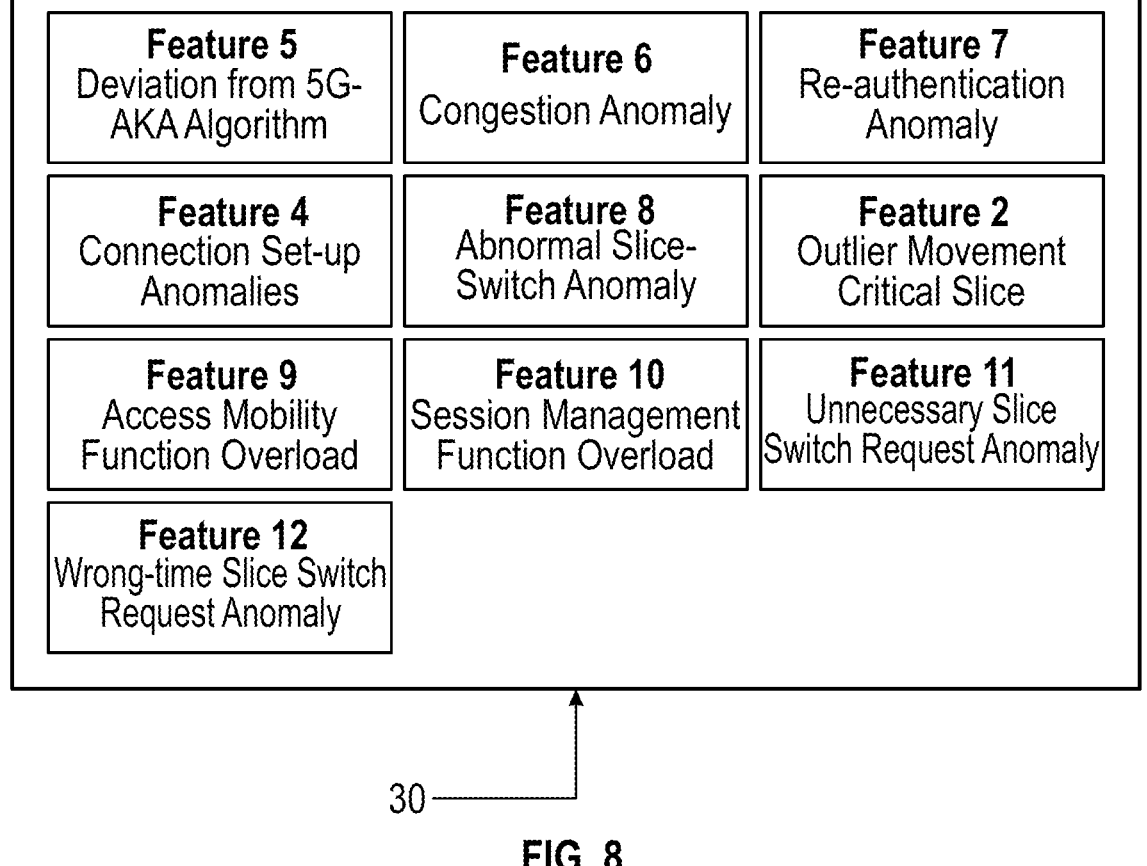
FIG. 8 lists the parameters that are monitored in real-time at core network.

Reference is made to FIGS. 7 and 8, which are the schematic block diagram illustration of the list of parameters that are monitored in real-time at gNB and core network. The parameters that are monitored at gNB (FIG. 8) include, viz. data packets (feature 1), outlier movement to critical slices (feature 2), control and signaling messages (feature 3), and connection set-up anomalies (feature 4). By analyzing data packets, the present disclosure ascertains at gNB only what type of device is sending these packets. As such, a device's capabilities could be identified and unnecessary slice switches can be curbed. Also, for example, it is normal for a vending machine to speak to its destination at 2 AM in the morning, sending at max 80 Kb data. Hence, when the present disclosure identifies that it is a vending machine and it is communicating with its destination with particular amount of data and outside of the normal time-frame, the present disclosure can identify abnormality. If unit 10 has identified some device as an outlier, its movement can be monitored and it can be stopped from moving into the slice of high security. The control and signaling messages are also monitored to identify control and signaling flood DDoS attacks. Feature 4 is monitored to check for any deviation from the normal procedure of connection set-up.

FIG. 8 embodies the parameters that are monitored at the core network. These include, viz. Deviation from 5G-AKA Algorithm (feature 5), congestion anomaly (feature 6), re-authentication anomaly (feature 7), connection set-up anomaly (feature 4), abnormal slice switch anomaly (feature 8), outlier movement to critical slices (feature 2), access mobility function overload (feature 9), session management function overload (feature 10), unnecessary slice switch request anomaly (feature 11), wrong time slice switch request anomaly (feature 12). Feature 5 determines any deviation from the standard 5G-AKA algorithm. Feature 6 operates to look for any abnormal congestion in the network by taking advantage of 5G's Network Data Analytics Function (NWDAF) function.

In some embodiments, re-authentication anomaly feature may identify if unnecessary re-authentication is happening from a device in view of overloading the involved core network functions.

The abnormal slice switch anomaly (feature 8) may function to determine, i) if the device is trying to access slices that it doesn't access on a routine basis. For example, if an IoT device switches to a slice at some specific time, there is no reason for it to switch to this slice at a different time-point. For example, a switch to gaming slice for a particular happens usually from 5 PM to 10 PM for a mobile phone device. A switch to the gaming slice in the middle of the day may identified as abnormal. ii) If the frequency of switch is more than routine frequency, iii) volume of data sent per unit time by the IoT device in the particular slice is exceptionally large compared to its normal behavior, iv) volume of data received per unit time by the IoT device in the particular slice is exceptionally large compared to its normal, v) Time length of data sent by a particular IoT device in the slice is larger than usual, vi) Time length of data sent by a particular IoT device in the slice is larger than usual. Features 9 and 10 identify if the core network functions AMF and SMF have become overloaded.

In some embodiments, unnecessary slice switch request anomaly (feature 11) may identify i) If switches are happening unnecessarily. For example, there is no reason for a vending machine to access the administrative domain of an organization. It will usually access its domain "xyzcafe-.com" but in an instance where it tries to access "iitd.ac.in" the slice switch will be identified as unnecessary as well as abnormal. The wrong time slice switch request anomaly (feature 12) is monitored to identify if slicing switching is happening at an unusual time.

The system performs a real-time attack surface analysis and automatically identifies suspected issues to help manage them. Deep neural network algorithms are used for real-time detection of DDoS attacks in the honeypots. To gather data, known DDoS attacks will be launched on the honeypots. By having security handled by the honeypot traps, the memory overhead of constrained IoT devices is eliminated. Since no dataset is available currently, the present disclosure created our own attack traffic. Cross validation techniques were used to measure the robustness of the best attack detection method. Taking inputs from honeypots, protection unit (40) could be placed at links between devices and gNB.

Figure 9:
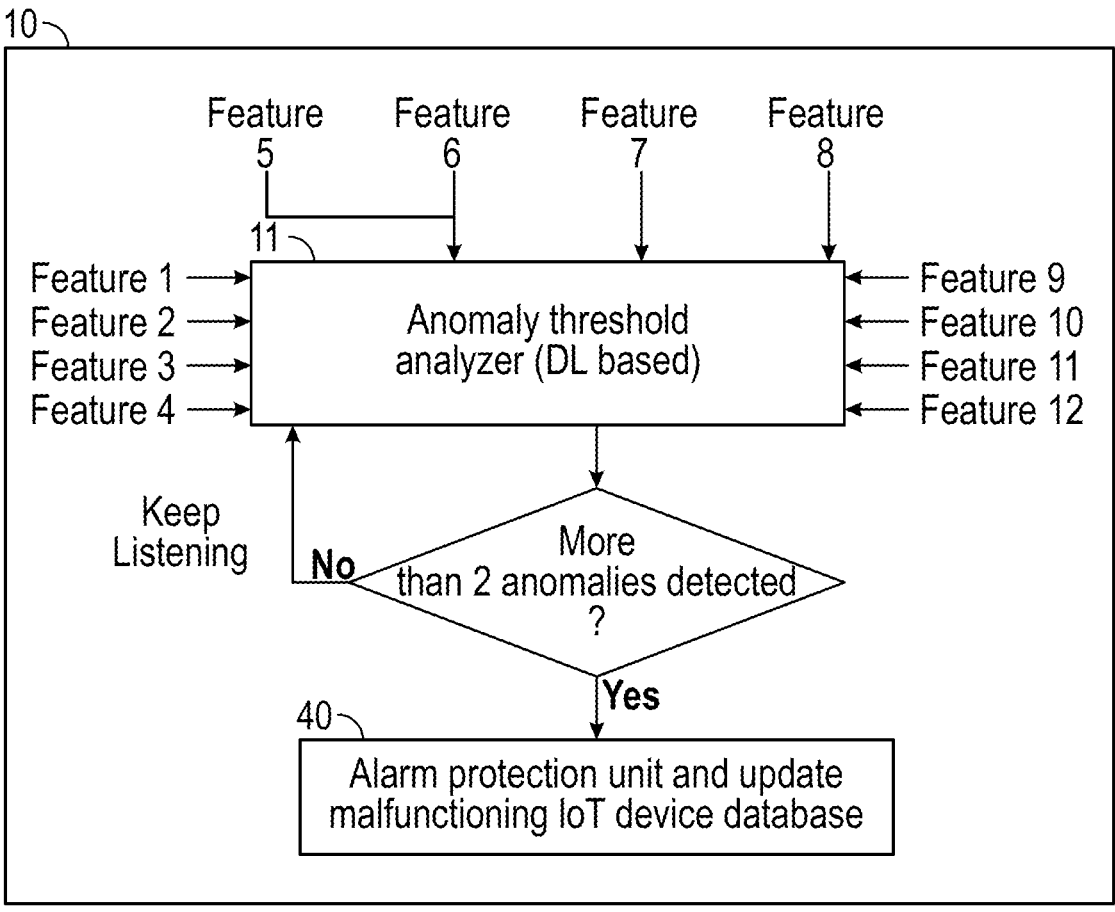
FIG. 9 is a schematic illustration of an alarm generation unit (10) that contains a deep learning-based anomaly threshold analyzer (11).

Reference is made to FIG. 9, which is a schematic illustration of an alarm generation unit (10) that contains a deep learning-based anomaly threshold analyzer (11). It takes the feature 1-12 as input and runs DL algorithms and fuzzy rule bases to identify anomalies. At any point if more than 2 anomalies are detected to be in the range that is out of tolerable limits, alarm protection unit (40) is notified and malfunctioning IoT device database is updated.

Figure 10:
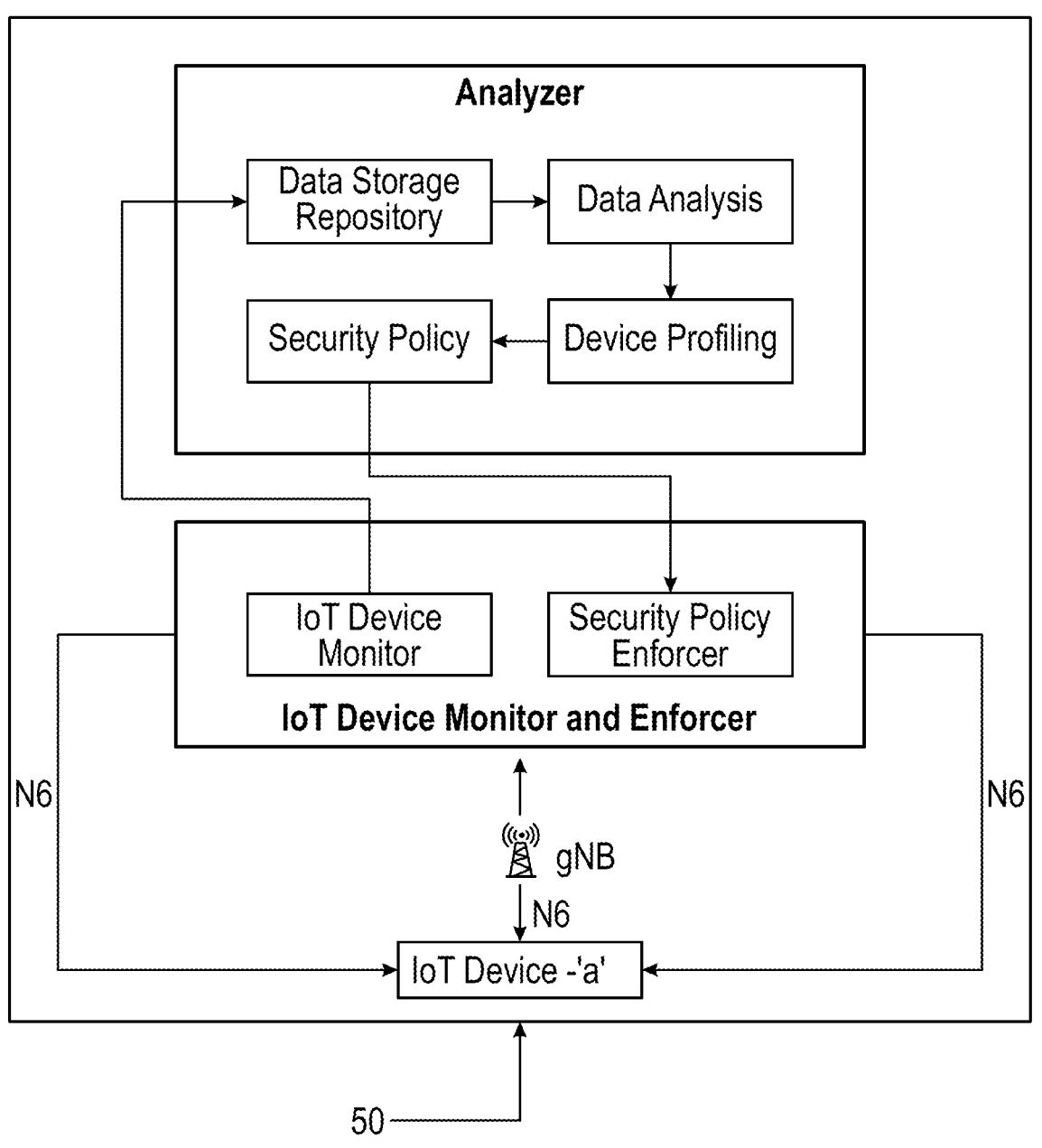
FIG. 10 is a schematic representation of the device profiling unit, demonstrating how the capabilities of an IoT device will be identified.

Reference is made to FIG. 10, which is a schematic representation of the device profiling unit (50). The device profiling/mapping unit can either be placed at the link connecting IoT devices and gNB or at the gNB itself. The profiling is done based on the type of traffic of the device to identify the type of the IoT device. For example, the present disclosure can monitor the domains accessed by a device on normal basis. For example, a coffee vending machine at IIT Delhi may normally contact nescafe.com; a connected bicycle may talk to domain "best-bicycle.com". The measuring units of an electricity traffic may only communicate with the domain "Delelectricity.com," and so on. Based on the data from multiple devices that access the same domain, a classification of IoT devices can be made along with a profile, and communication behavior that matches the profile can be used to figure out what kind of IoT device it is. It can help us in restricting the device only to certain specific slices. FIG. 10 is a schematic representation of the device profiling system (50). Reference point 'N6' connects device to gNB. IoT device monitor and enforcer unit may be placed either at gNB or the links connecting devices to gNB. The monitored values for each device are recorded in the data storage repository. Based on certain parameters like normal range of control messages that a particular device can send, normal domains that they access, etc. data analysis and device profiling is performed. The security policies can then be made according to the profile and security policy enforcer can enforce these rules through different links.

The core network talks to the Internet through two different channels: an operations, Administration, and Management (OA&M) channel and a data traffic channel. IoT Service 1 and IoT Service 2 are examples of services that add value and are offered by the CSP to the business that owns the IoT devices.

Figure 11:
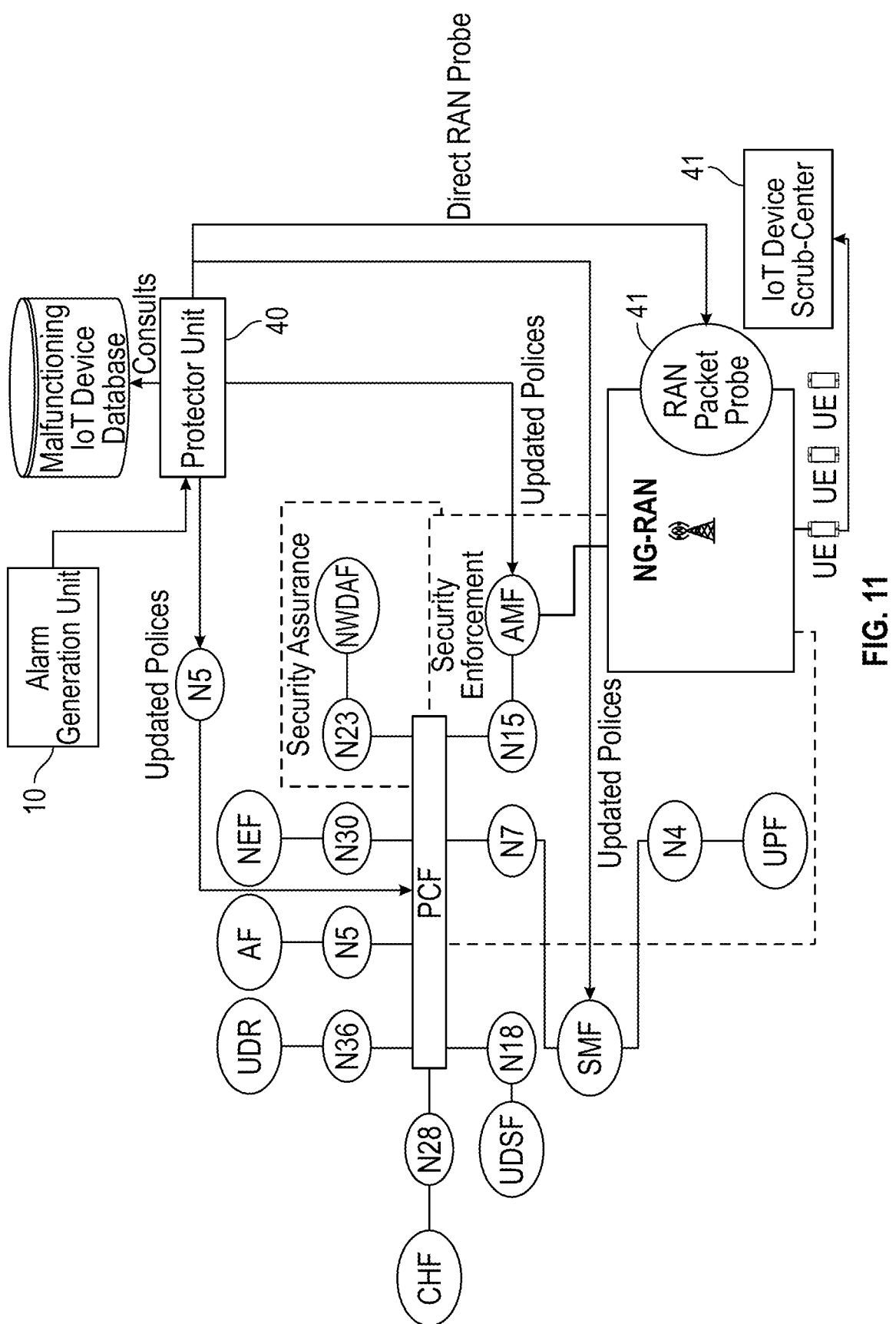
FIG. 11 is a schematic representation of the Protection Unit (40) and its components as well as the interfaces.

Reference is made to FIG. 11 which is a schematic representation of the Protection Unit (40) and its components as well as the interfaces. It connects directly to SMF and AMF and with Policy Control Function (PCF) via N5. Once the best parameters are identified, the policies are developed to alleviate the DDoS attack. 5GS is built on a unified policy control framework that enables for the creation of consistent network-wide regulations. PCF is a Network Function defined in TS 23.503 that provides a single and unified framework for defining any type of policy in the network, such as for Data Network (DN) access, and delivering those policies to other control plane NFs, such as AMF and Session Management Function SMF, as appropriate for each function.

The primary function of existing security capabilities like firewalls, IDS's etc., is to protect the network in some manner. It can be the entire network or a restricted part of it but they do not look at the individual devices/UEs. In the context of IoT slices in 5G, it is not only important to identify the malicious UEs but to separate them from the slice by applying effective remedies. In the case of IoT 5G network slices, the inherently insecure nature of low-end IoT devices puts them at an enhanced risk of compromise. It is, therefore, extremely important that security policies be developed on a per-UE basis so that the misbehaving UE's can be identified. The approach of the present disclosure supplements the already existing security methods and improves network security from end to end, turning all 5GS network operations in radio, and core into active security enforcers.

Currently, as per the 5G standards, PCF is the only framework that defines the policies for any network element. FIG. 11 puts a focus on the schema of PCF along with its interconnection to various Network Functions for the enforcement of security policies. Network Data Analytics Function (NWDAF) is focused on the analysis of malicious behavior, load related data, and performance of the network.

Reference is made to FIG. 12 which gives a reference point description of all the present User Plane security enforcements.

In the solution of the present disclosure, the PCF will still remain the main policy decision point but two more application points are added, viz. AMF and SMF. This is because, these functions can reach individual UE's via various reference points and as such, the policies can be enforced on the maliciously behaving devices/UE's. As seen in FIG. 11, SMF can talk to user equipment (UE) directly on the UPF via N4 reference point using session management signaling or through AMF via N1 reference point. That is, there is a clear path from PCF (decision point) to AMF and SMF (policy enforcement points.)

Figure 13:
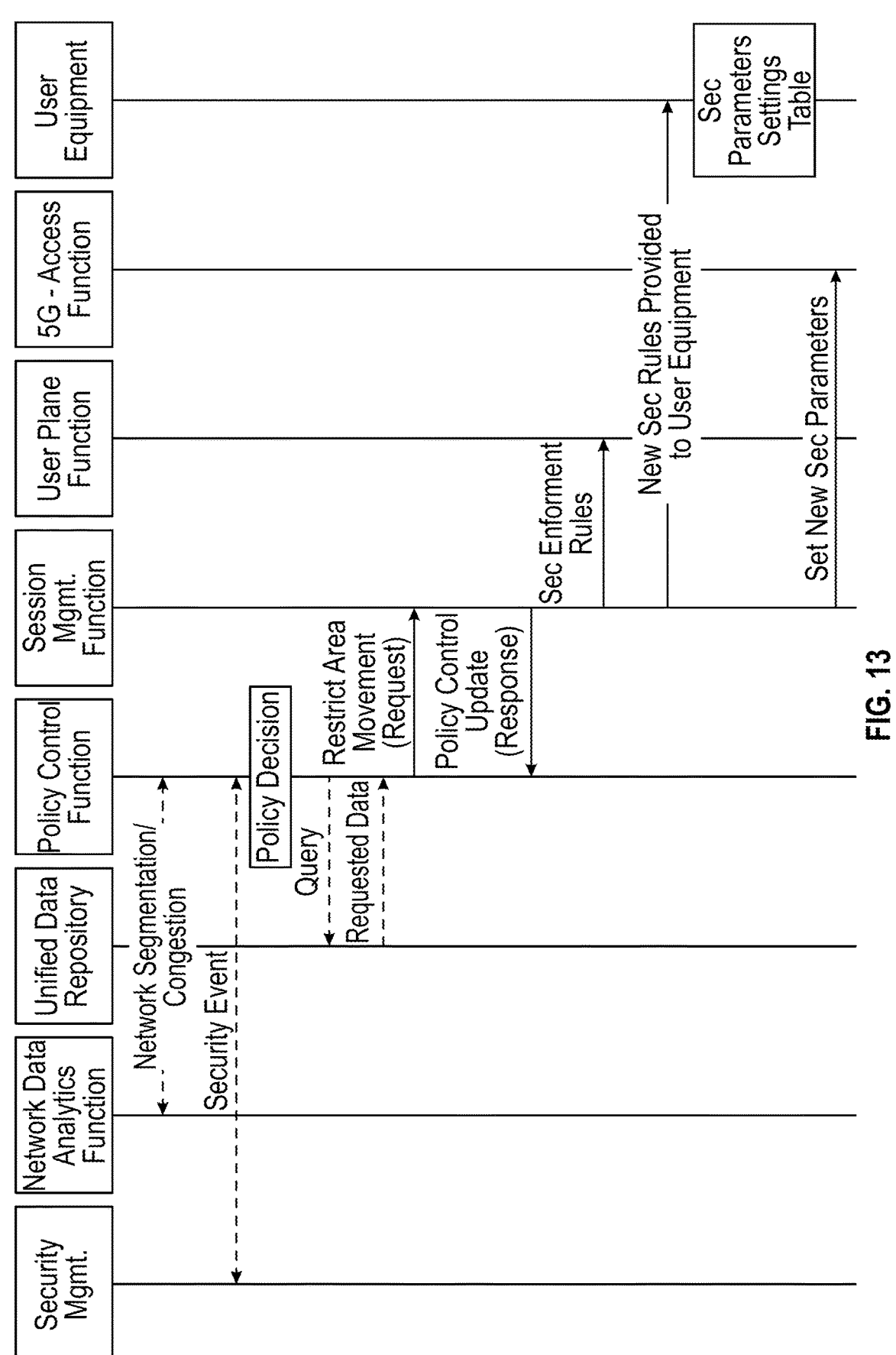
FIG. 13 presents the embodiment of call flow of security policies to misbehaving IoT devices and other network functions.

Reference is made to FIG. 13 which is a schematic description of the flow of a security call. An example of the flow of calls included when a DDoS event takes place is shown in FIG. 13. The details of this call are as follows:

Call from Network Data Analytics Function (NWDAF) to decision point PCF: One of things that Network Data Analytics Function (NWDAF) is responsible for is the analytics of network traffic. In case of a DDoS attack, Network Data Analytics Function (NWDAF) will note congestion of user data. The present disclosure set up an alarm in such case and PCF subscribes to such alarms. The information will be transferred to PCF from Network Data Analytics Function (NWDAF) from the N23 interface/reference point.

Call from Security management module to decision point PCF: The present disclosure used and Intrusion Detection System (IDS) trap for detecting any security incidents. The Intrusion Detection System (IDS) system will be integrated with PCF using the REST API.

Call from decision point PCF to UDR: When PCF gets a notification for a security incident; it refers to UDR to ask if it contains any policy specific to the attack being faced. The communication happens through the N36 reference point.

Call from decision point PCF to SMF: Once PCF makes a decision regarding the policy change on the user equipment (UE), it notifies SMF via the N7 interface. For example, it might ask SMF to change the Aggregate Maximum Bit Rate (AMBR) of particular user equipment (UE).

Call from SMF to decision point PCF: SMF responds to the policy change request from PCF.

Call from SMF to UPF: The enforcement of the rule sent by SMF is done by UPF which actually changes the AMBR of the user equipment (UE) via N4 in this case.

Call from SMF to UE: SMF can also communicate with user equipment (UE) by the exchange of SM signally on N1 interface.

Call from SMF to 5G-AN through AMF: AMF connects to 5G-AN through N2 interface. Therefore, SMF can communicate with 5G-AN through AMF to set QoS and security parameters in it. It may include reserving the resources for particular kind of traffic, etc.

Security Policy application through AMF: For dealing with DDoS attack, following policies can be enforced through AMF:

1) Area movement restriction: the present disclosure set up the Allowed/not allowed areas for devices, i.e., the disclosure restrict their movement to make sure if a particular device allowed entering a particular high security area/not. For example, if a compromised device is found in one of the slices, its movement into the neighboring high security slices can be barred.

2) Policies on UEs falling nearby critical geographical locations/NS: Specific policies enforcing integrity protection, replay protection can be enforced on the user equipments (UEs) that fall under specific NSs or are connected to a critical gNB.

3) Cleansing-centers: We use the scrubbing centers (special security service) for affected user equipments (UEs) to keep a close watch on them and restore them to their original functionality. Policy will be to terminate current PDU and switch to a special 'Cleansing' PDU where specific policies will be used throughout the path of data.

4) Policies on affected UEs: Change/reduce UE-AMBR based on its identified malicious behavior. It is a type of cleaning for the user equipment (UE) when it has been compromised. The affected UE's will not be allowed to send re-authentication requests to the core. They will be restricted to the cleansing centers.

Security Policy application through SMF: The security policies that the present disclosure has enforced via SMF include:

1) Movement of static SMF policies to PCF for dynamism: Transfer these security policies to PCF and include them in the dynamic PCC rules for user plane security, as well as extending them to other domains like, N3, N6, and N9. N3 is used for communication between 5G-RAN and UPF. It is specified that for all the N3 user data traffic to be confidentiality, integrity and replay protected. However, the choice of using these protections is operator dependent. It may or may not use them. N6 is the interface for communication among the packet data networks and User Plane Function. N9 is used for connecting between operators. The policy here is to include both AMF and SMF for the activation of cryptographic solution in N3. It will be implemented on the gNB through AMF and via SMF on the UPF's security gateway side. Similar policy can be used on N9.

These policies can be circulated to different interfaces through N6.

Configuration of the Proposed Apparatus

The apparatus used have the following configurations which are compliant with the Third Generation Partnership Project (3GPP) specifications 33.501, 38.101 and 38.104 [33, 34, 44, 45]:

IoT device used: We have used Tmote sky IoT devices. They have a 10 KB RAM and 48 KB flash memory. They uses 8 MHz Texas Instruments MSP430 microcontroller and have integrated ADC, DAC, Supply Voltage Supervisor, and DMA Controller. Moreover, they have integrated onboard antenna with 50 m range indoors/125 m range outdoors. They are fitted with 250 kbps, 2.4 GHz IEEE 802.15.4 Chipcon Wireless Transceiver and display interoperability with other IEEE 802.15.4 devices. They also include TinyOS support, integrated Humidity, Temperature, and Light sensors, Ultra-low current consumption and fast wakeup from sleep (<6 μs). The operating configurations are as shown in Table 1.

TABLE 1

| Operating characteristics of Tmote Sky (IoT device used) | | |
|---|---|---|
| Operating Configurations | Nominal | Maximum |
| Supplied voltage | 2.1 V | 3.6 V |
| Microcontroller on, Radio Reception | 21.8 mA | 23 mA |
| Microcontroller on, Radio Transmission | 19.5 mA | 21 mA |
| Microcontroller on, Radio OFF | 1800 A | 2400 A |
| Microcontroller Idle, Radio OFF | 54.5 A | 1200 A |
| Microcontroller standby | 5.1 A | 21.0 A |

AMF: Is compliant with the following specifications specified in the Third Generation Partnership Project (3GPP) specification 33.501.

It is expected that the AMF will be able to decipher NAS-signaling.

Confidentiality protection NAS-signaling is optional.

The AMF shall support the following encryption algorithms: NEA0, 128-NEA1, and 128-NEA2 and it may support the 128-NEA3 encryption algorithm.

When the guidelines allow, confidentiality protection should be used.

The AMF must be able to protect the integrity of NAS-signaling and prevent it from being replayed.

The AMF must support the following integrity protection algorithms: NIA-0, 128-NIA1, 128-NIA2, and 128-NIA3.

NIA0 should be turned off in AMF deployments where supporting an emergency session without authentication is not required by law.

The AMF should be able to use the SUCI to start primary authentication.

The AMF should be able to give the user equipment (UE) a 5G-GUTI.

The AMF should be able to reassign 5G-GUTI to UE.

The user equipment (UE) and the home network should be able to confirm SUPI to the AMF. If this confirmation fails, the AMF will not give service to the UE.

SMF: The SEAF is able to use SUCI for primary authentication.

UDM: The long-term key (or keys) that are used for authentication and setting up security associations must be shielded from any physical threats and must never leave the protected environment of the UDM/ARPF. This is to ensure that the keys remain secure at all times.

AUSF: Both the Third Generation Partnership Project (3GPP) and non-3GPP authentication requests will be handled by the Authentication server function (AUSF). Among the prerequisites are, for example:

If VPLMN made an authentication request containing SUCI, the AUSF must only provide SUPI to VPLMN after receiving authentication confirmation.

UDMs will be notified if a subscriber is successfully or unsuccessfully authenticated by the AUSF.

Although certain embodiments of the invention has been illustrated and described, it will at once be apparent to those skilled in the art that the invention includes advantages and features over and beyond the specific illustrated construction. Accordingly, it is indented that the scope of the invention be limited solely by the scope of the hereinafter appended claims, and not by the forgoing specification, when interpreted in light of the relevant prior art.

What is claimed is:

1. A method for real-time and lightweight detection and mitigation of Distributed Denial of Service (DDoS) attacks in Internet of Things (IoT) network slices of a 5G network, the method comprising:

implementing a 5G Service-Based Architecture (5G-SBA);

identifying weakest points in an IoT slice through continuous monitoring of network behavior;

turning the identified weakest points into one or more honeypots;

monitoring, in real time at a gNodeB (gNB) and at one or more core network functions, a plurality of features including at least: data packets, outlier movement to critical slices, control/signaling messages, connection setup behavior, deviation from 5G Authentication and Key Agreement (5G-AKA), congestion, re-authentication frequency, abnormal slice switching, Access Mobility Function (AMF)/Session Management Function (SMF) overload, unnecessary slice switch requests, and wrong-time slice switch requests;

applying a machine-learning or deep-learning based anomaly analyzer to the plurality of monitored features and declaring an attack condition upon detection of concurrent anomalies across the plurality of monitored features; and enforcing, via the AMF, the SMF, and a Policy Control Function (PCF), per-user equipment (UE) security policies including restricting slice switching, redirecting affected UE to a cleansing protocol data unit (PDU) session, and adjusting UE aggregate maximum bit rate (AMBR) via a user plane function (UPF).

2. The method of claim 1, wherein the one or more honeypots are installed on a device layer or on a communication links between IoT devices and the gNB.

3. The method of claim 1, wherein the one or more honeypots are deployed to deceive the attackers.

4. The method of claim 1, wherein the one or more honeypots are constantly monitored for new threats and analyzed to build required threat intelligence to proactively mitigate production systems from similar attack surfaces.

\*    \*    \*    \*    \*